US010540574B2

(12) United States Patent
Hu et al.

(10) Patent No.: US 10,540,574 B2
(45) Date of Patent: Jan. 21, 2020

(54) IMAGE COMPRESSION METHOD AND RELATED DEVICE

(71) Applicant: Shanghai Cambricon Information Technology Co., Ltd, Pudong New Area (CN)

(72) Inventors: Shuai Hu, Pudong New Area (CN); Jie Wei, Pudong New Area (CN); Xiaofu Meng, Pudong New Area (CN)

(73) Assignee: Shanghai Cambricon Information Technology Co., Ltd, Pudong New Area (CN)

( * ) Notice: Subject to any disclaimer, the term of this patent is extended or adjusted under 35 U.S.C. 154(b) by 0 days.

(21) Appl. No.: 16/529,041

(22) Filed: Aug. 1, 2019

(65) Prior Publication Data

US 2019/0354811 A1    Nov. 21, 2019

(51) Int. Cl.
| | |
|---|---|
| *G06T 9/00* | (2006.01) |
| *G06K 9/62* | (2006.01) |
| *H04N 19/30* | (2014.01) |
| *H04N 19/85* | (2014.01) |
| *H04N 19/46* | (2014.01) |

(52) U.S. Cl.
CPC ......... *G06K 9/6262* (2013.01); *G06K 9/6256* (2013.01); *H04N 19/30* (2014.11); *H04N 19/46* (2014.11); *H04N 19/85* (2014.11)

(58) Field of Classification Search
CPC ...................... H04N 19/00–99; G06T 9/00–40
See application file for complete search history.

(56) References Cited

U.S. PATENT DOCUMENTS

| 10,158,859 | B2* | 12/2018 | Nowozin | H04N 19/149 |
| 10,402,700 | B2* | 9/2019 | van den Oord | G06K 9/66 |
| 10,417,788 | B2* | 9/2019 | Risman | G06N 3/08 |
| 10,432,953 | B2* | 10/2019 | Wierstra | G06T 9/002 |
| 2017/0345130 | A1* | 11/2017 | Wang | G06T 3/4046 |
| 2018/0139458 | A1* | 5/2018 | Wang | H04N 19/33 |
| 2018/0174047 | A1* | 6/2018 | Bourdev | G06K 9/00744 |
| 2018/0174275 | A1* | 6/2018 | Bourdev | H04N 19/167 |
| 2018/0242017 | A1* | 8/2018 | Van Leuven | H04N 19/597 |
| 2018/0293758 | A1* | 10/2018 | Bar-On | G06T 9/002 |
| 2019/0007690 | A1* | 1/2019 | Varadarajan | H04N 19/167 |
| 2019/0035113 | A1* | 1/2019 | Salvi | G06N 3/08 |
| 2019/0043201 | A1* | 2/2019 | Strong | G06K 9/00993 |
| 2019/0045203 | A1* | 2/2019 | Varadarajan | H04N 19/137 |

(Continued)

*Primary Examiner* — Sean T Motsinger
(74) *Attorney, Agent, or Firm* — Getech Law LLC; Jun Ye

(57) ABSTRACT

An example image compression method may include acquiring an original image with a first resolution; compressing the original image on the basis of the target model to obtain a compressed image with a second resolution; recognizing the compressed image on the basis of a recognition neural network model to obtain reference tag information; acquiring a loss function according to the target tag information and the reference tag information; if the loss function is convergent to a first threshold value or the present number of training times of the compression neural network is more than or equal to a second threshold value, acquiring a target original image with the first resolution, and determining the target model as a corresponding compression neural network model if training of the compression neural network is completed; compressing the target original image on the basis of the compression neural network model.

14 Claims, 6 Drawing Sheets

(56) References Cited

U.S. PATENT DOCUMENTS

| | | | |
|---|---|---|---|
| 2019/0045207 A1* | 2/2019 | Chen | H04N 19/80 |
| 2019/0066257 A1* | 2/2019 | Daga | G06T 1/60 |
| 2019/0188882 A1* | 6/2019 | Son | G06T 9/002 |
| 2019/0206091 A1* | 7/2019 | Weng | G06K 9/46 |
| 2019/0244394 A1* | 8/2019 | Gueguen | G06N 3/02 |
| 2019/0297326 A1* | 9/2019 | Reda | G06N 3/0454 |

* cited by examiner

IMAGE COMPRESSION METHOD AND RELATED DEVICE

TECHNICAL FIELD

The disclosure relates to the field of image compression, and particularly to an image compression method and related device.

BACKGROUND

Along with arrival of the big data era, data keeps growing explosively. Massive data containing information is transferred between users. Image, as a vision foundation for perception of the world by the human beings, is an important means for the human beings to acquire information, express information, and transfer information.

In related arts, image compression can effectively reduce a data volume and increase an image transfer rate. However, after an image is compressed, it is unlikely to reserve all information of the original image. Therefore, how to perform image compression is still a technical problem to be solved by those skilled in the art.

SUMMARY

An aspect of the application provides an image compression method, which may include:
  acquiring an original image with a first resolution, in which the original image may be any training image in a compression training image set of a compression neural network and tag information of the original image may be determined as target tag information;
  compressing the original image on the basis of a target model to obtain a compressed image with a second resolution, in which the second resolution may be lower than the first resolution and the target model may be a present compression neural network model of the compression neural network;
  recognizing the compressed image on the basis of a recognition neural network model to obtain reference tag information, in which the recognition neural network model may be a corresponding recognition neural network model if training of a recognition neural network is completed;
  acquiring a loss function according to the target tag information and the reference tag information;
  if the loss function is convergent to a first threshold value or the present number of training times of the compression neural network is more than or equal to a second threshold value, acquiring a target original image with the first resolution, and determining the target model as a corresponding compression neural network model if training of the compression neural network is completed; and
  compressing the target original image on the basis of the compression neural network model to obtain a target compressed image with the second resolution.

An embodiment of the application, the image compression method may further include:
  if the loss function is not convergent to the first threshold value or the present number of training times of the compression neural network is smaller than the second threshold value, upgrading the target model according to the loss function to obtain an updated model, where the updated model may be determined as the target model, a next training image may be determined as the original image, and acquiring the original image with the first resolution is performed.

An embodiment of the application, recognizing the compressed image on the basis of the recognition neural network model to obtain the reference tag information may include:
  preprocessing the compressed image to obtain an image to be recognized; and
  recognizing the image to be recognized on the basis of the recognition neural network model to obtain the reference tag information.

An embodiment of the application, preprocessing may include size processing, and preprocessing the compressed image to obtain the image to be recognized may include:
  if an image size of the compressed image is smaller than a basic image size of the recognition neural network, filling the compressed image with pixels according to the basic image size to obtain the image to be recognized.

An embodiment of the application, the compression training image set may include at least a recognition training image set, and the image compression method may further include:
  adopting the recognition training image set to train the recognition neural network to obtain the recognition neural network model, and each training image in the recognition training image set including at least tag information consistent with a type of the target tag information.

An embodiment of the application, after compressing the target original image on the basis of the compression neural network model to obtain the target compressed image with the second resolution, the method may further include:
  compressing the target compressed image on the basis of the recognition neural network model to obtain tag information of the target original image, and storing the tag information of the target original image.

An embodiment of the application, the compression training image set may include multiple dimensions, and compressing the original image on the basis of the target model to obtain the compressed image with the second resolution may include:
  recognizing the original image on the basis of the target model to obtain multiple pieces of image information, in which each dimension may correspond to a piece of the image information; and
  compressing the original image on the basis of the target model and the multiple pieces of the image information to obtain the compressed image.

Another aspect of the application provides an image compression device, which may include a processor and a memory connected with the processor.

The memory may be configured to store a first threshold value, a second threshold value, a present neural network model and training times of a compression neural network, a compression training image set of the compression neural network, tag information of each training image in the compression training image set, a recognition neural network model, and a compression neural network model. The present neural network model of the compression neural network is determined as a target model, the compression neural network model is a corresponding target model if training of the compression neural network is completed, and the recognition neural network model is a corresponding neural network model if training of a recognition neural network is completed.

The processor may be configured to acquire an original image with a first resolution, in which the original image may be any training image in the compression training image set and tag information of the original image may be determined as target tag information. The processor may be further configured to compress the original image on the basis of the target model to obtain a compressed image with a second resolution, in which the second resolution may be lower than the first resolution. The processor may be further configured to recognize the compressed image on the basis of the recognition neural network model to obtain reference tag information. The processor may be further configured to acquire a loss function according to the target tag information and the reference tag information. If the loss function is convergent to the first threshold value or the count of training times is more than or equal to the second threshold value, the processor may be configured to acquire a target original image with the first resolution, to determine the target model as the compression neural network model, and to compress the target original image on the basis of the compression neural network model, so as to obtain a target compressed image with the second resolution.

An embodiment of the application, the processor may be further configured to, if the loss function is not convergent to the first threshold value or the count of training times is smaller than the second threshold value, update the target model according to the loss function to obtain an updated model, to determine the updated model as the target model, to determine a next training image as the original image, and to perform the operation of acquiring the original image with the first resolution.

An embodiment of the application, the processor may be configured to preprocess the compressed image to obtain an image to be recognized, and to recognize the image to be recognized on the basis of the recognition neural network model to obtain the reference tag information.

An embodiment of the application, preprocessing may include size processing. The memory may be further configured to store a basic image size of the recognition neural network. The processor may be further configured to, if an image size of the compressed image is smaller than the basic image size, fill the compressed image with pixels according to the basic image size to obtain the image to be recognized.

An embodiment of the application, the compression training image set may include at least a recognition training image set, and the processor may be further configured to adopt the recognition training image set to train the recognition neural network to obtain the recognition neural network model, in which each training image in the recognition training image set may include at least tag information consistent with a type of the target tag information.

An embodiment of the application, the processor may be further configured to recognize the target compressed image on the basis of the recognition neural network model to obtain tag information of the target original image; and the memory may be further configured to store the tag information of the target original image.

An embodiment of the application, the compression training image set may include multiple dimensions, and the processor may be further configured to recognize the original image on the basis of the target model to obtain multiple pieces of image information, in which each dimension may correspond to a piece of the image information, and to compress the original image on the basis of the target model and the multiple pieces of the image information, so as to obtain the compressed image.

Another aspect of the application provides another electronic device, which may include a processor, a memory, a communication interface, and one or more programs, where the one or more programs are stored in the memory and are configured to be performed by the processor, and the programs include instructions configured for part or all of the operations described in the abovementioned image compression method.

Another aspect of the application provides a computer-readable storage medium, which stores a computer program, where the computer program may include a program instruction, and the program instruction is performed by a processor to enable the processor to perform the abovementioned image compression method.

After adopting the image compression method and the related devices, the compressed image of the original image is acquired on the basis of the target model, the reference tag information of the compressed image is acquired on the basis of the recognition neural network model, the loss function is acquired according to the target tag information included in the original image and the reference tag information, if the loss function is convergent to the first threshold value or the present number of training times of the compression neural network is more than or equal to the second threshold value, training of the compression neural network configured for image compression is completed, the target model is determined as the compression neural network model, and the target compressed image of the target original image may be acquired on the basis of the compression neural network model. In other words, the loss function is acquired through a reference tag value obtained by the recognition neural network model obtained by training and a target tag value of the original image, training is completed if the loss function meets a preset condition or the present number of training times of the compression neural network exceeds the preset threshold value, otherwise the compression neural network is trained to repeatedly regulate its weight, in other words, an image content represented by each pixel in the same image is regulated, so as to reduce loss of the compression neural network, improve image compression effectiveness, and further facilitate improvement of the recognition accuracy.

DETAILED DESCRIPTION OF THE EMBODIMENTS

In order to make the purpose, technical solutions and advantages of the disclosure clearer, the disclosure will further be described below in combination with specific embodiments and with reference to the drawings in detail.

An aspect of the application provides an image compression method and device, which may be applied to training of a compression neural network configured for image compression, so that image compression effectiveness and recognition accuracy can be improved.

Figure 1:
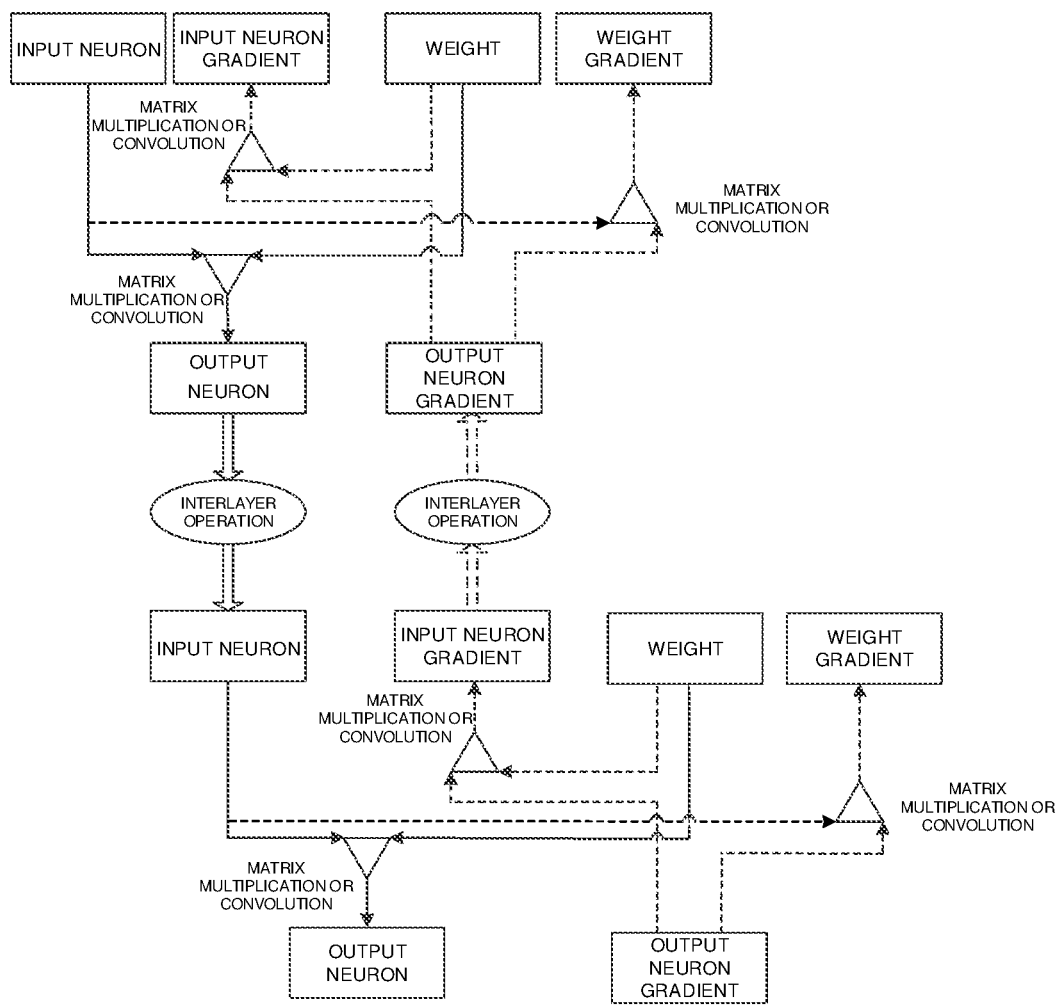
FIG. 1 is a schematic diagram of operation of a neural network according to an embodiment of the application.

FIG. 1 is a neural network computation process according to an embodiment of the application. As shown in FIG. 1, dotted arrows in the figure represent reverse computation and solid arrows represent forward computation. During the forward computation, after performing for a previous layer of an artificial neural network is completed, an output neuron obtained by the previous layer is determined as an input neuron of a next layer for computation (or the output neuron is determined as the input neuron of the next layer after processed by some operations), and meanwhile, a weight is also replaced with a weight of the next layer. During the reverse computation, after performing of reverse computation for the previous layer of the artificial neural network is completed, an input neuron gradient obtained by the previous layer is determined as an output neuron gradient of the next layer for computation (or the output neuron gradient is determined as the input neuron gradient of the next layer after processed by some operations), and meanwhile, the weight is also replaced with the weight of the next layer.

A forward propagation stage of the neural network corresponds to the forward computation and is a process from input of input data to output of output data. A back propagation stage corresponds to the reverse computation and is a process that an error between final result data and expected output data is reversely subjected to the forward propagation stage. Forward propagation and back propagation are repeated, the weight of each layer is corrected in an error gradient descent manner, and the weight of each layer is regulated. It is also a neural network learning and training process. Network output errors may be reduced.

In the application, types of compression training image sets of the compression neural network and the numbers of training images in the training image sets of each type are not limited. If there are more types, the numbers are larger, and the count of training times is larger, an image compression loss rate is lower and improvement of image recognition accuracy may be facilitated.

A compression training image set may include multiple dimensions of images at multiple angles, images under multiple light intensities, images acquired by various types of image acquisition devices, or the like. Training the compression neural network for compression training image sets corresponding to different dimensions may improve the image compression effectiveness under different conditions and extend an application range of the image compression method.

For tag information of a training image in a compression training image set, a specific content of the tag information is not limited in the application. A part of an image to be trained may be marked to detect whether training of the compression neural network is completed or not. For example, in a driving image shot by a road video monitor, tag information can be target license number information. The driving image is input into the compression neural network to obtain a compressed image. The compressed image is recognized on the basis of a recognition neural network model to obtain reference license number information. If the reference license number information is matched with the target license number information, it may be determined that training of the compression neural network is completed. Otherwise, if the present number of training times of the compression neural network is smaller than a preset threshold value, the compression neural network is still required to be trained.

A type of the tag information is not limited in the application. It may be license number information and may also be face information, traffic sign information, object classification information, and the like.

The recognition neural network model involved in the application is data obtained if training of a recognition neural network configured for image recognition is completed. A training method for the recognition neural network is not limited. Batch Gradient Descent (BGD), Stochastic Gradient Descent (SGD), mini-batch SGD, or the like may be adopted for training. A training period is completed by single forward computation and reverse gradient propagation.

Each training image in a recognition training image set at least may include tag information consistent with a type of target tag information of each training image in compression training images. In other words, the recognition neural network model may recognize a compressed image output by the compression neural network (to be trained or having been trained).

For example, if a type of tag information of a compression training image is a license number, a type of tag information of a recognition training image at least may include the license number. Therefore, the recognition neural network model may be ensured to recognize the compressed image output by the compression neural network to obtain license number information.

In one implementation, the compression training image set at least may include the recognition training image set.

Since the images in the training image set are limited by influence of factors such as the angle, the light, or the image acquisition device, adopting the recognition training image for training may improve the accuracy of the recognition neural network model to further improve training efficiency of the compression neural network, for example, facilitating improvement of the image compression effectiveness.

Figure 2:
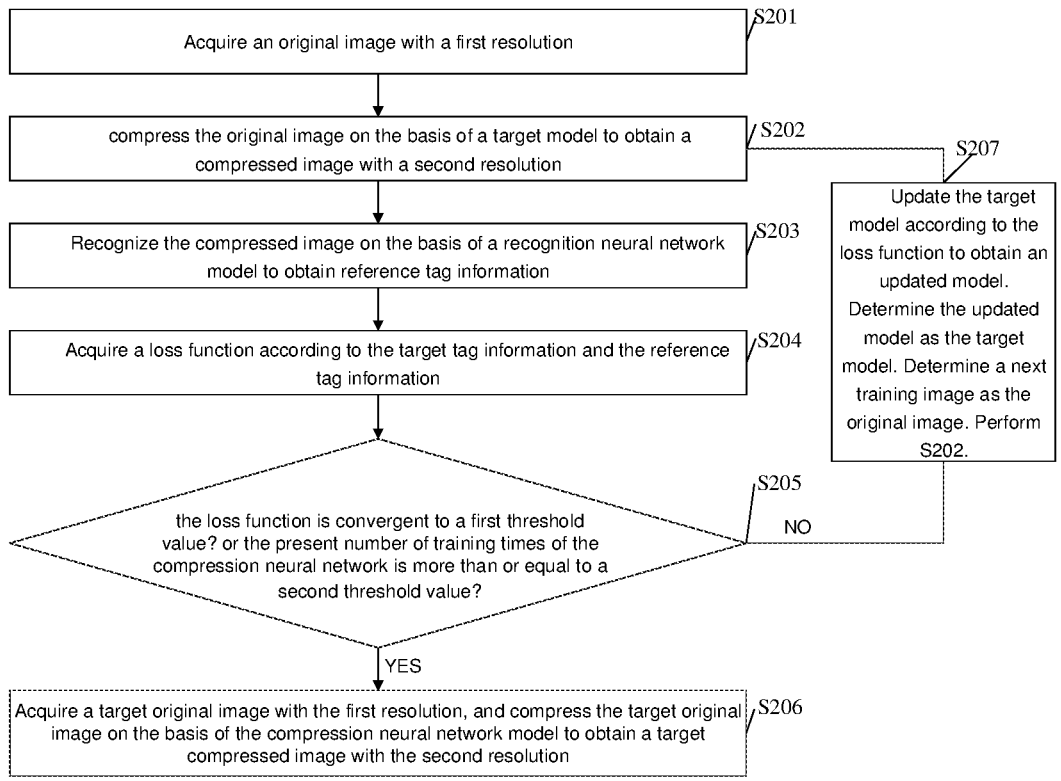
FIG. 2 is a schematic flowchart of an image compression method according to an embodiment of the application.

FIG. 2 is a schematic flowchart of an image compression method according to an embodiment of the application. As shown in FIG. 2, the image compression method may include the following.

In S201, an original image with a first resolution is acquired.

The first resolution is an input resolution of a compression neural network. A second resolution is lower than the first resolution and is an output resolution of the compression neural network. A compression ratio (a ratio of the second resolution to the first resolution) of an image input into the compression neural network is fixed. In other words, if different images are compressed on the basis of the same compression neural network model, images with the same compression ratio may be obtained.

The original image is any training image in a compression training image set of the compression neural network. Tag information of the original image is determined as target tag information. The tag information is not limited in the application. The tag information may be marked by artificial recognition, and may also be obtained by inputting the original image into a recognition neural network and performing recognition on the basis of a recognition neural network model, etc.

In S202, the original image is compressed on the basis of a target model to obtain a compressed image with a second resolution.

The target model is a present neural network model of the compression neural network. In other words, the target model is a present parameter of the compression neural network. The original image of which the resolution is equal to the input resolution of the compression neural network may be compressed on the basis of the target model to obtain the compressed image of which the resolution is equal to the output resolution of the compression neural network.

In one implementation, compressing the original image is compressed on the basis of the target model to obtain the compressed image with the second resolution may include: recognizing the original image on the basis of the target model to obtain multiple pieces of image information; and compressing the original image on the basis of the target model and the multiple pieces of image information to obtain the compressed image.

The abovementioned training image may include multiple dimensions. The original image may be recognized on the basis of the target model at first to determine image information corresponding to each dimension, and then the original image is compressed for each piece of image information. Therefore, accuracy of image compression under different dimensions is improved.

In S203, the compressed image is recognized on the basis of a recognition neural network model to obtain reference tag information.

A recognition method is not limited in the application and may include two parts, for example, feature extraction and feature recognition. A result obtained by the feature recognition is determined as the reference tag information. For example, reference tag information corresponding to a compressed driving image obtained after a driving image is compressed is a license number, and reference tag information corresponding to a compressed face image obtained after a face image is compressed is a face recognition result.

In one implementation, recognizing the compressed image on the basis of the recognition neural network model to obtain the reference tag information may include: preprocessing the compressed image to obtain an image to be recognized; and recognizing the image to be recognized on the basis of the recognition neural network model to obtain the reference tag information.

Preprocessing may include, but is not limited to, any one or more of: data format conversion processing (for example, normalization processing and integer type conversion), data deduplication processing, data exception processing, missing data filling processing, and the like. Preprocessing the compressed image may improve recognition efficiency and accuracy of image recognition.

Similarly, acquiring the original image with the first resolution may include: receiving an input image; and preprocessing the input image to obtain the original image. Preprocessing the input image may improve compression efficiency of image compression.

Preprocessing may further include size processing. A neural network has a fixed size requirement, in other words, only an image equal to a basic image size of the neural network may be processed. A basic image size of the compression neural network is determined as a first basic image size and a basic image size of the recognition neural network is determined as a second basic image size. In other words, a size requirement of the compression neural network on the input image is that an image size of the input image is equal to the first basic image size, and a size requirement of the recognition neural network on the input image is that the image size of the input image is equal to the second basic image size. The compression neural network may compress an image consistent with the first basic image size to obtain a compressed image. The recognition neural network may recognize an image consistent with the second basic image size to obtain reference tag information.

A specific size processing manner is not limited in the application, which may include a cropping or pixel filling manner, may also adopt a manner of scaling according to the basic image size, may further adopt an input image downsampling method, and the like.

Peripheral pixel cropping refers to cropping a noncritical information region on a periphery of an image. Downsampling processing refers to a process of reducing a sampling rate of a specific signal. For example, an average value of four adjacent pixels is computed as a value of a pixel at a position corresponding to the four pixels of the processed image, so that a size of the image is reduced.

In one implementation, the operation that the compressed image is preprocessed to obtain the image to be recognized may include that: if an image size of the compressed image is smaller than the basic image size of the recognition neural network, the compressed image is filled with pixels according to the basic image size to obtain the image to be recognized.

The pixels are not limited in the application and may correspond to any color mode, for example, rgb(0, 0, 0). Specific pixel filling positions are also not limited and may be any position except the compressed image. In other words, the compressed image is not processed, and instead, a pixel filling manner is adopted for image extension. Therefore, the compressed image may be prevented from deformation, and improvement of the recognition efficiency and accuracy of image recognition may be facilitated.

Figure 3:
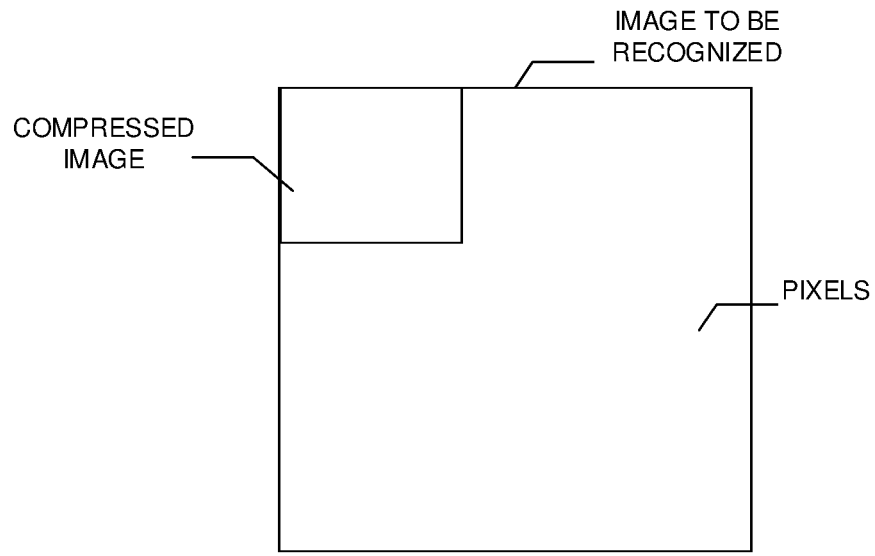
FIG. 3 is a schematic diagram of a scenario of a size processing method according to an embodiment of the application.

For example, as shown in FIG. 3, the compressed image is placed at a left upper position of the image to be recognized, and positions, except the compressed image, of the image to be recognized are filled with pixels.

Similarly, preprocessing the input image to obtain the original image may include: if an image size of the input image is smaller than the first basic image size of the compression neural network, filling the input image with pixels according to the first basic image size to obtain the original image. After pixel filling, the original image to be compressed is recognized by the recognition neural network to obtain the reference tag information. Since the pixel filling does not change a compression rate of the input image, training efficiency and accuracy of the compression neural network can be improved.

In S204, a loss function is acquired according to the target tag information and the reference tag information.

In the application, the loss function may be configured to describe a magnitude of an error between the target tag information and the reference tag information. The tag information may include multiple dimensions, and is usually computed by a formula for a difference of two squares:

$$E = \frac{1}{2}\sum_{k=1}^{c}(t_k - y_k)^2$$

where c is the dimension of the tag information, $t_k$ is the $k^{th}$ dimension of the reference tag information and $y_k$ is the $k^{th}$ dimension of the target tag information.

In S205, whether the loss function is convergent to a first threshold value or whether the present number of training times of the compression neural network is more than or equal to a second threshold value is judged; if the loss function is convergent to a first threshold value or the present number of training times of the compression neural network is more than or equal to a second threshold value is judged, S206 is performed; if the loss function is not convergent to a first threshold value or whether the present number of training times of the compression neural network is not more than or equal to a second threshold value is judged, S207 is performed.

In the training method for the compression neural network involved in the application, a training period corresponding to each training image is completed by single forward computation and reverse gradient propagation. A threshold value of the loss function is set to be the first threshold value. A threshold value of the count of training times of the compression neural network is set to be the second threshold value. If the loss function is convergent to the first threshold value or the count of training times is more than or equal to the second threshold value, training of the compression neural network is completed, and the target model is determined as a corresponding compression neural network model if training of the compression neural network is completed. Otherwise, a back propagation stage of the compression neural network is started according to the loss function. The target model is updated according to the loss function and training is performed for the next training image. In other words, S202-S205 are performed, and if the abovementioned condition is met, training is ended and S206 is performed.

Figure 4:
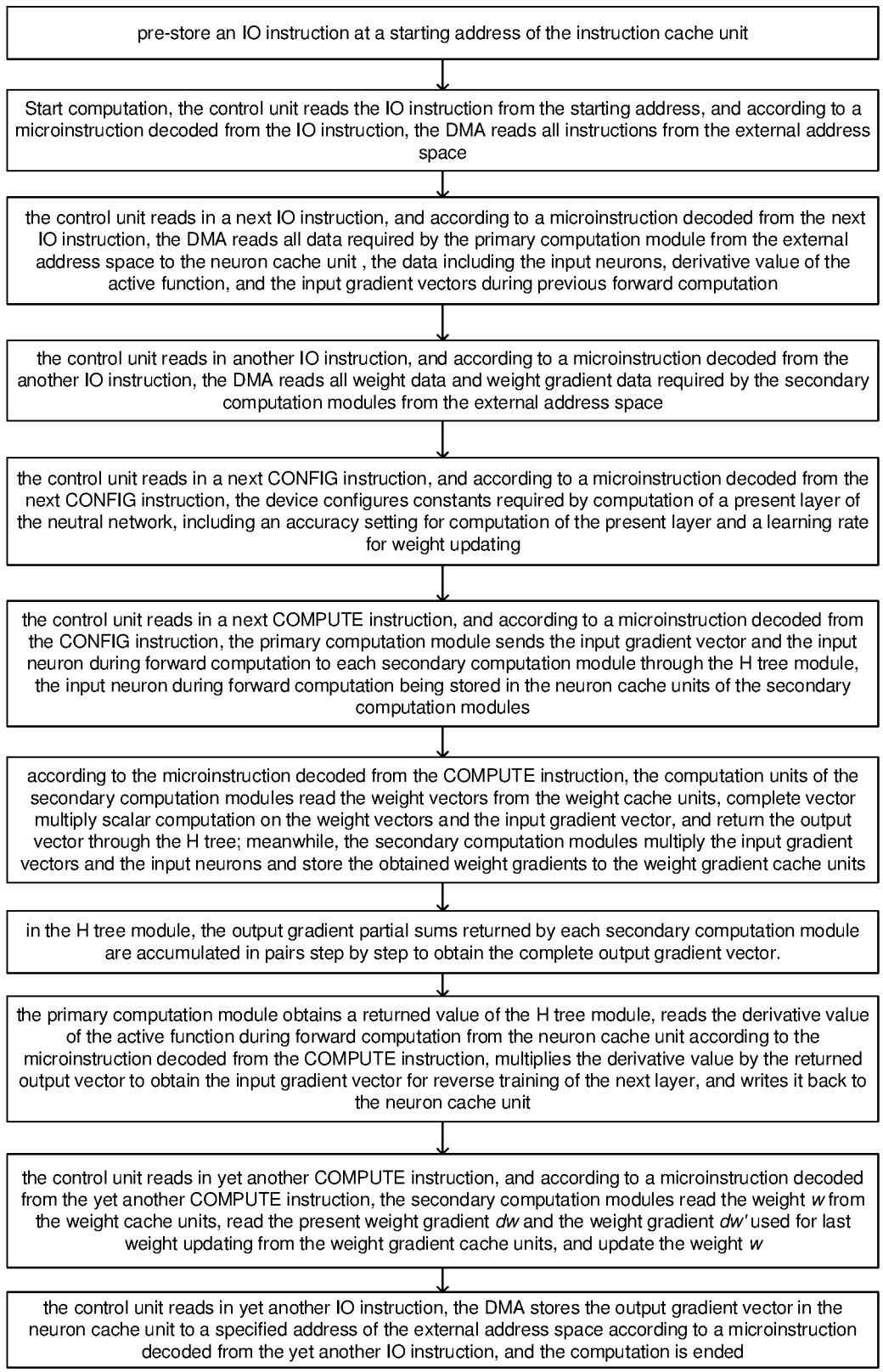
FIG. 4 is a schematic flowchart of a single-layer neural network operation method according to an embodiment of the application.

A reverse training method for the compression neural network is not limited in the application. As an implementation, reference can be made to the flowchart of a single-layer neural network computation method provided in FIG. 4. FIG. 4 may be applied to a schematic structure diagram of a device for performing compression neural network reverse training in FIG. 5.

Figure 5:
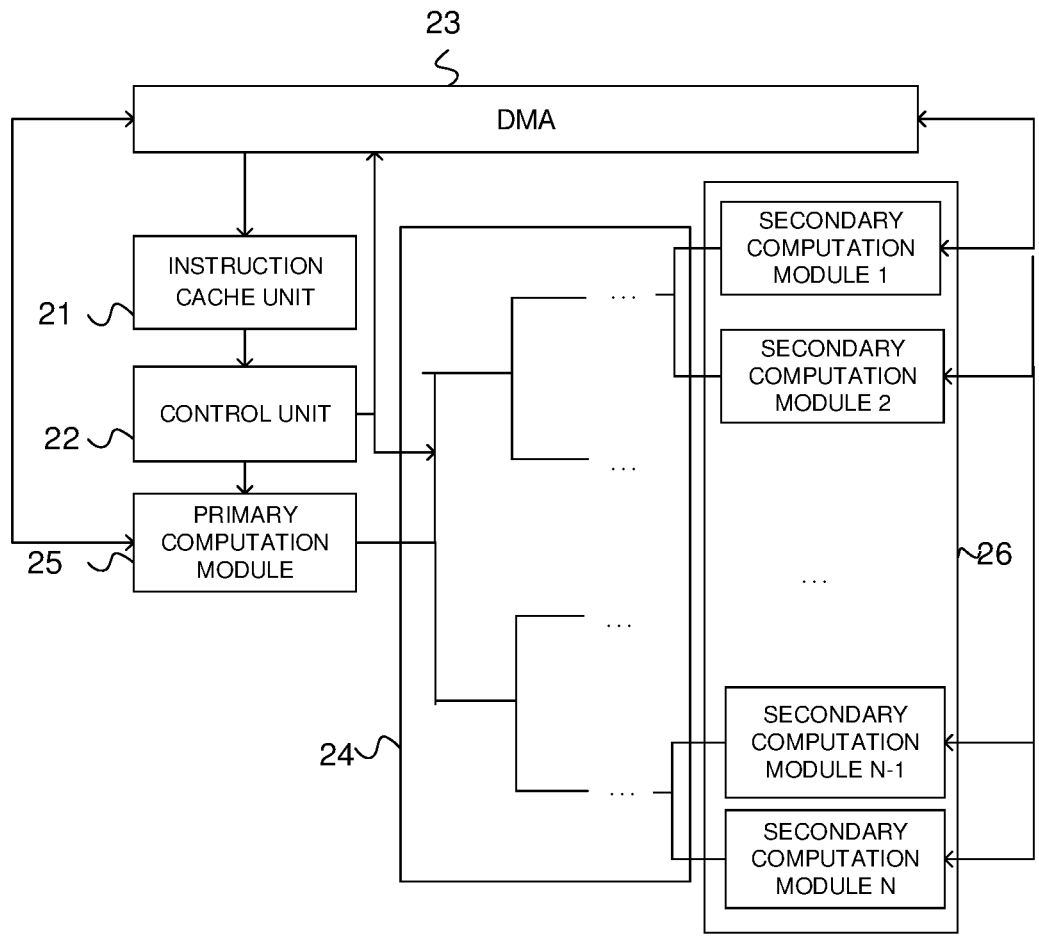
FIG. 5 is a schematic structure diagram of a device for performing compression neural network reverse training according to an embodiment of the application.

As shown in FIG. 5, the device may include an instruction cache unit 21, a control unit 22, a DMA 23, an H tree module 24, a primary computation module 25, and multiple secondary computation modules 26. The device may be implemented through a hardware circuit (for example, an ASIC).

The instruction cache unit 21 may be configured to read an instruction in through the DMA 23 and to cache the read-in instruction. The control unit 22 may be configured to read the instruction from the instruction cache unit 21 and to decode the instruction into a microinstruction controlling an operation of another module, the another module being, for example, the DMA 23, the primary computation module 25, and the secondary computation module 26. The DMA 23 may be configured to access an external address space and to directly read and write data from/into each cache unit in the device so as to complete data loading and storage.

Figure 6:
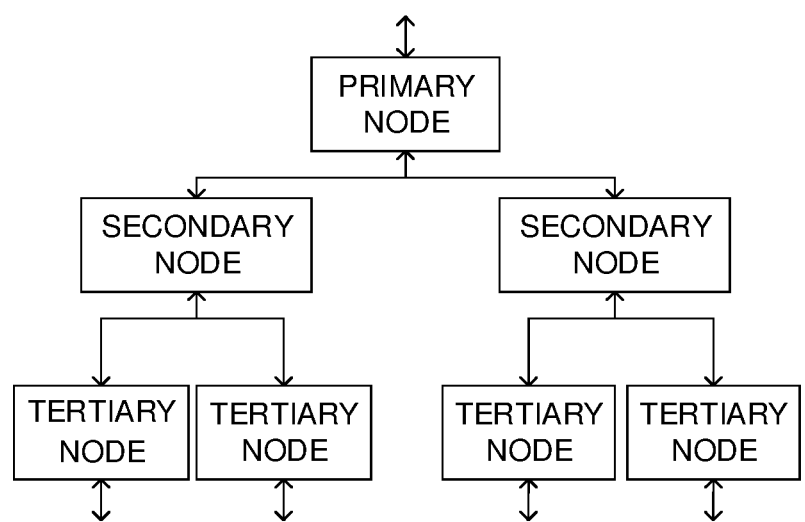
FIG. 6 is a schematic structure diagram of an H tree module according to an embodiment of the application.

FIG. 6 shows a structure of the H tree module 24. As shown in FIG. 6, the H tree module 24 forms a data path between the primary computation module 25 and the multiple secondary computation modules 26 and has an H tree structure. An H tree has binary tree paths formed by multiple nodes. Each node sends data of an upstream to two nodes of a downstream, merges data returned by the two nodes of the downstream, and returns the data merged to the node of the upstream. For example, in a reverse computation process of a neural network, vectors returned by the two nodes of the downstream may be added into a vector at the present node and returned to the node of the upstream. In a computation starting stage of each layer of the artificial neural network, an input gradient in the primary computation module 25 is sent to each secondary computation module 26 through the H tree module 24. After a computation process of each secondary computation module 26 is completed, output gradient vector partial sums output by each secondary computation module 26 may be added with one another in the H tree module 24 step by step. In other words, all the output gradient vector partial sums are summed as a final output gradient vector.

Figure 7:
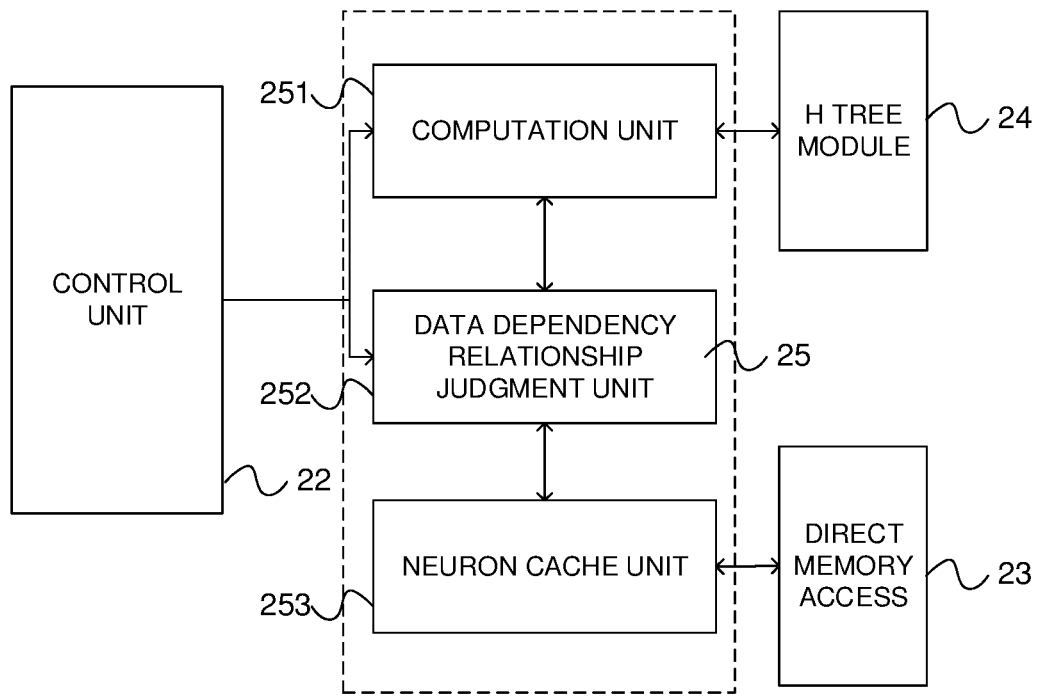
FIG. 7 is a schematic structure diagram of a primary computation module according to an embodiment of the application.

FIG. 7 is a schematic structure diagram of the primary computation module 25. The primary computation module 25 may include a computation unit 251, a data dependency relationship judgment unit 252, and a neuron cache unit 253.

The neuron cache unit 253 may be configured to cache input data and output data used by the primary computation module 25 in a computation process. The computation unit 251 may be configured to complete various computational functions of the primary computation module. The data dependency relationship judgment unit 252 may be configured as a port through which the computation unit 251 reads and writes the neuron cache unit 253, and may ensure no read/write consistency conflict of data in the neuron cache unit 253. In one implementation, the data dependency relationship judgment unit 252 judges whether a dependency relationship is formed between data of a microinstruction which has yet not been performed and data of a microinstruction which is under performing, if a dependency relationship is not formed between data of a microinstruction which has yet not been performed and data of a microinstruction which is under performing, allows the microinstruction to be sent immediately, otherwise allows the microinstruction to be sent only after all microinstructions the microinstruction depends on are performed. For example, all microinstructions sent to the data dependency relationship judgment unit 252 may be stored in an instruction queue of the data dependency relationship judgment unit 252. In this queue, if a data reading range of a read instruction conflicts with a data writing range of a write instruction located in the front of the queue, the instruction may be performed only after the write instruction it depends on is performed. In addition, the data dependency relationship judgment unit 252 may be configured to read an input gradient vector from the neuron cache unit 253 and to send the input gradient vector to the secondary computation modules 26 through the H tree module 24. Output data of the secondary computation modules 26 is directly sent to the first computation unit 251 through the H tree module 24. The instruction sent by the control unit 22 is sent to the computation unit 251 and the data dependency relationship judgment unit 252 to control their operations.

Figure 8:
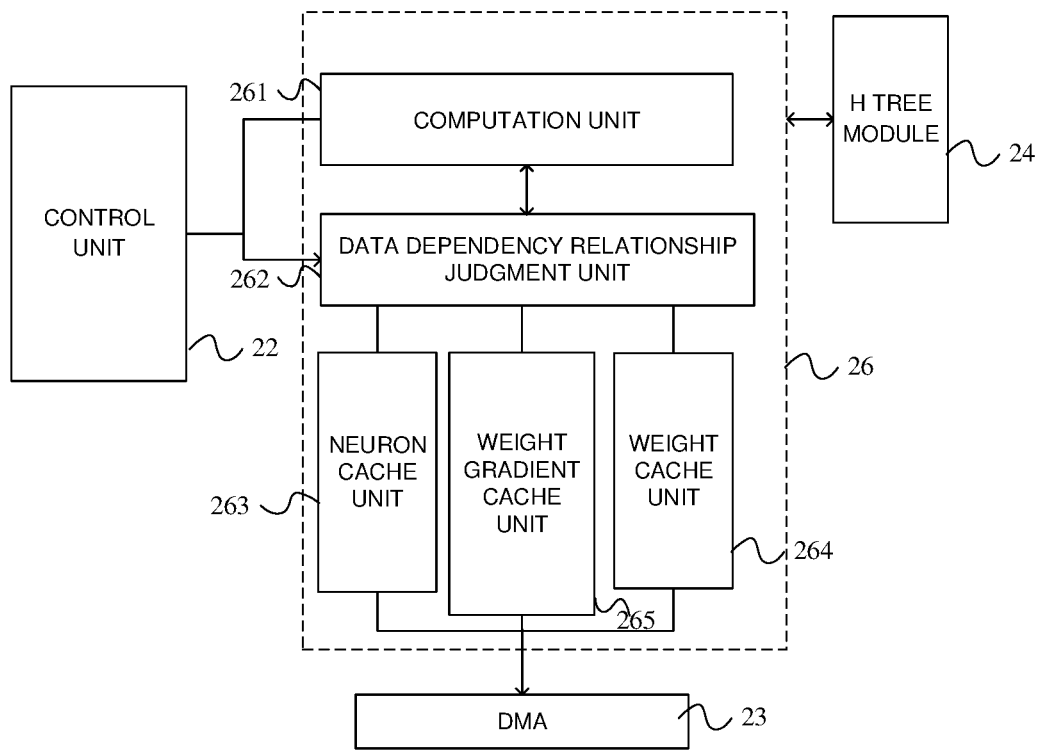
FIG. 8 is a schematic structure diagram of a computation module according to an embodiment of the application.

FIG. 8 is a schematic structure diagram of the secondary computation module 26. As shown in FIG. 8, each secondary computation module 26 may include a computation unit 261, a data dependency relationship judgment unit 262, a neuron cache unit 263, a weight cache unit 264, and a weight gradient cache unit.

The computation unit 261 may be configured to receive a microinstruction sent by the control unit 22 and to perform arithmetic logical operation.

The data dependency relationship judgment unit 262 is responsible for a read/write operation over the cache unit in a computation process. The data dependency relationship judgment unit 262 may be configured to ensure no read/ write consistency conflict of the cache unit. In one implementation, the data dependency relationship judgment unit 262 may be configured to judge whether a dependency relationship is formed between data of a microinstruction which has yet not been performed and data of a microinstruction which is under performing. If a dependency relationship is not formed between data of a microinstruction which has yet not been performed and data of a microinstruction which is under performing, allows the microinstruction to be sent immediately, otherwise allows the microinstruction to be sent only after all microinstructions the microinstruction depends on are performed. For example, all microinstructions sent to the data dependency relationship judgment unit 262 may be stored in an instruction queue of the data dependency relationship judgment unit 262. In this queue, if a data reading range of a read instruction conflicts with a data writing range of a write instruction located in the front of the queue, the instruction may be performed only after the write instruction it depends on is performed.

The neuron cache unit 263 may be configured to cache input gradient vector data and an output gradient vector partial sum obtained by computation of the secondary computation module 26.

The weight cache unit 264 may be configured to cache a weight vector required by the secondary computation module 26 in the computation process. For each secondary computation module 26, only a column corresponding to the secondary computation module 26 in a weight matrix may be stored.

The weight gradient cache unit 265 may be configured to cache weight gradient data required by the secondary computation module 26 in a weight updating process. The weight gradient data stored by each secondary computation module 26 corresponds to a weight vector stored in the secondary computation module.

In a process of computing the output gradient vectors for reverse training of each layer of the artificial neural network, the secondary computation modules 26 may be configured to implement the first half part of the process which can be concurrently operated and to update the weights. For example, for a fully connected layer of the artificial neural network (a Multi-Layer Perceptron (MLP)), the process is illustrated by out_gradient=w*in_gradient. Multiplication of the weight matrix w and the input gradient vector in_gradient may be divided into unrelated concurrent computation subtasks. The out_gradient and the in_gradient are column vectors. Each secondary computation module 26 only computes products of part of scalar elements of in_gradient and corresponding columns of the weight matrix w. Each obtained output vector is a partial sum to be accumulated of a final result. These partial sums are added in pairs step by step in the H tree to obtain the final result. Therefore, the computation process is turned into concurrent partial sum computation processes and a subsequent accumulation process. Each secondary computation module 26 computes a partial sums of the output gradient vector, and all the partial sums are accumulated in the H tree module 24 to obtain a final output gradient vector. Each secondary computation module 26 simultaneously multiplies the input gradient vectors and output of each layer during forward computation to compute weight gradients and then to update the weights stored in the secondary computation module 26. Forward computation and reverse training are two main processes of a neural network algorithm. For a training (updating) process of weights of the neural network, the neural network needs to compute forward output of input vectors in the network formed by the present weights at first, which is the forward computation process, and reversely train (update) the weights of each layer layer-by-layer according to difference values between output values and tagged values of the input vectors, which is the reverse training process. In the forward computation process, output vectors of each layer and a derivative value of an active function may be stored, which are required in the reverse training process. Therefore, the data (the output vectors and the derivative value) has certainly existed at the start of reverse training. The output values of each layer in the forward computation are data required at the start of reverse computation, which may be cached in the primary computation module through the DMA and sent to the secondary computation modules through the H tree. The primary computation module 25 performs subsequent computation on the basis of the output gradient vector, for example, multiplying the output gradient vector by a derivative of the active function during forward computation to obtain an input gradient value of the next layer. The derivative of the active function during forward computation is data required at the start of reverse computation, which may be cached in the primary computation module through the DMA.

According to an embodiment of the application, an instruction set for performing of artificial neural network forward computation on the abovementioned device is further provided. The instruction set may include a CONFIG instruction, a COMPUTE instruction, an IO instruction, a NOP instruction, a jump instruction, and a move instruction.

The CONFIG instruction may be configured to configure various constants required by computation of a present layer before computation of each layer of an artificial neural network is started.

The COMPUTE instruction may be configured to complete arithmetic logical computation for each layer of an artificial neural network.

The IO instruction may be configured to read in input data required by computation from an external address space and to store the data back into the external space after computation is completed.

The NOP instruction may be configured to clear present microinstructions in all microinstruction cache queues in the device to ensure that all instructions before the NOP instruction are performed. The NOP instruction does not include any operation.

The jump instruction may be configured to control jump of an address of a next instruction to be read by the instruction cache unit to implement jump of a control flow.

The move instruction may be configured to move data at a certain address of an internal address space of the device to another address of the internal address space of the device. The process is independent from the computation unit, with no resource of the computation unit occupied if being performed.

Figure 9:
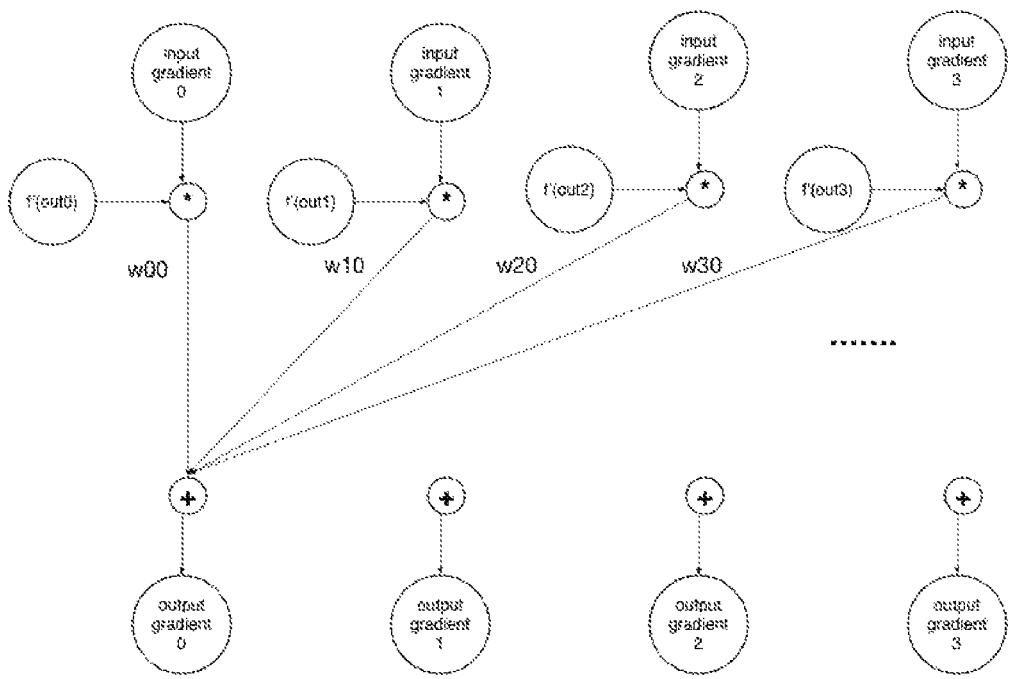
FIG. 9 is an exemplary block diagram of compression neural network reverse training according to an embodiment of the application.

FIG. 9 is an exemplary block diagram of compression neural network reverse training according to an embodiment of the application. A process of computing an output gradient vector is out_gradient=w*in_gradient, where matrix vector multiplication of a weight matrix w and an input gradient vector in_gradient may be divided into unrelated concurrent computation subtasks. Each secondary computation module 26 computes a partial sum of the output gradient vector, and all the partial sums are accumulated in the H tree module 24 to obtain a final output gradient vector. In FIG. 9, an output gradient vector input gradient of a previous layer is multiplied by a derivative of a corresponding active function to obtain input data of a present layer, and the input data is multiplied by the weight matrix to obtain the output gradient vector. A process of computing a weight updating gradient is illustrated by dw=x*in_gradient. Each secondary computation module 26 computes an updating gradient of a weight of a part corresponding to the secondary computation module. The secondary computation module 26 multiplies the input gradient by an input neuron during forward computation to compute the weight updating gradient dw, and then updates the weight w according to a learning rate set by an instruction by use of w, dw and a weight updating gradient dw' used for last weight updating.

As shown in FIG. 9, input gradient ([input gradient0, . . . , input gradient3] in FIG. 9) is an output gradient vector of the $(n+1)^{th}$ layer. The output gradient vector is multiplied by a derivative value ([f (out0), . . . , f (out3)] in FIG. 9) of the $n^{th}$ layer in a forward computation process to obtain an input gradient vector of the $n^{th}$ layer at first. The process is completed in the primary computation module 25. The input gradient vector is sent to the secondary computation modules 26 by the H tree module 24 and is temporally stored in the neuron cache units 263 of the secondary computation modules 26. Then, the input gradient vector is multiplied by the weight matrix to obtain an output gradient vector of the $n^{th}$ layer. In this process, the $i^{th}$ secondary computation module computes a product of the $i^{th}$ scalar of the input gradient vector and a column vector [w_i0, . . . , w_iN] of the weight matrix. Obtained output vectors of the abovementioned process are accumulated in pairs step by step in the H tree module 24 to obtain a final output gradient vector output gradient ([output gradient0, . . . , output gradient3] in FIG. 9).

Meanwhile, the secondary computation modules 26 are also required to update the weights stored in the secondary computation modules. The process of computing the weight updating gradient is illustrated by dw_ij=x_j*in_gradient_i, where x_j is the $j^{th}$ element of the input (for example, output of an $(n-1)^{th}$ layer) vector of the $n^{th}$ layer during forward computation and in_gradient_i is the $i^{th}$ element of the input gradient vector (for example, the product of input gradient and the derivative f' in FIG. 9) of the $n^{th}$ layer during reverse computation. Input of the $n^{th}$ layer during forward computation is data existing at the start of reverse training, and is sent to the secondary computation modules 26 through the H tree module 24 and temporally stored in the neuron cache units 263. Then, the secondary computation modules 26, after completing computation of the partial sums of the output gradient vector, multiply the $i^{th}$ scalar of the input gradient vector and the input vector of the $n^{th}$ layer during forward computation to obtain weight updating gradient vectors dw and accordingly update the weights.

As shown in FIG. 4, an IO instruction is pre-stored at a starting address of the instruction cache unit. The control unit reads the IO instruction from the starting address of the instruction cache unit, and according to a microinstruction decoded from the IO instruction, the DMA reads all instructions related to single-layer artificial neural network reverse training from the external address space and caches them in the instruction cache unit. The control unit reads in a next IO instruction from the instruction cache unit, and according to a microinstruction decoded from the next IO instruction, the DMA reads all data required by the primary computation module from the external address space to the neuron cache unit of the primary computation module, the data including the input neurons, derivative value of the active function, and the input gradient vectors during previous forward computation. The control unit reads in another IO instruction from the instruction cache unit, and according to a microinstruction decoded from the another IO instruction, the DMA reads all weight data and weight gradient data required by the secondary computation modules from the external address space and stores them in weight cache units and weight gradient cache units of the corresponding secondary computation modules respectively. The control unit reads in a next CONFIG instruction from the instruction cache unit, and according to a microinstruction decoded from the next CONFIG instruction, the computation unit configures values of a register in the computation unit, including various constants required by computation of the present layer of the neural network, an accuracy setting for computation of the present layer, a learning rate for weight updating, and the like. The control unit reads in another COMPUTE instruction from the instruction cache unit, and according to a microinstruction decoded from the another CONFIG instruction, the primary computation module sends the input gradient vector and the input neuron during forward computation to each secondary computation module through the H tree module, in which the input gradient vector and the input neuron during forward computation may be stored in the neuron cache units of the secondary computation modules. According to a microinstruction decoded from the COMPUTE instruction, the computation units of the secondary computation modules read the weight vectors (for example, part of columns of the weight matrix stored in the secondary computation modules) from the weight cache units, complete vector multiply scalar computation on the weight vectors and the input gradient vector, and return the partial sums of the output vector through the H tree. Meanwhile, the secondary computation modules multiply the input gradient vectors and the input neurons and store the obtained weight gradients to the weight gradient cache units. In the H tree module, the output gradient partial sums returned by each secondary computation module are accumulated in pairs step by step to obtain the complete output gradient vector. The primary computation module obtains a returned value of the H tree module, reads the derivative value of the active function during forward computation from the neuron cache unit according to the microinstruction decoded from the COMPUTE instruction, multiplies the derivative value by the returned output vector to obtain the input gradient vector for reverse training of the next layer, and writes it back to the neuron cache unit. The control unit reads in yet another COMPUTE instruction from the instruction cache unit, and according to a microinstruction decoded from the yet another COMPUTE instruction, the secondary computation modules read the weight w from the weight cache units, read the present weight gradient dwand the weight gradient dw' used for last weight updating from the weight gradient cache units, and update the weight w. The control unit reads in yet another IO instruction from the instruction cache unit, the DMA stores the output gradient vector in the neuron cache unit to a specified address of the external address space according to a microinstruction decoded from the yet another IO instruction, and the computation is ended.

An implementation process for a multilayer artificial neural network is similar to the process for the single-layer neural network. After performing for a previous layer of the artificial neural network is completed, an operation instruction of a next layer may take an output gradient vector computed in the primary computation module as an input gradient vector for training of the next layer for the abovementioned computation process. A weight address and weight gradient address in the instruction may also be changed into addresses corresponding to the present layer.

With adoption of the device for performing neural network reverse training, support to the multilayer artificial neural network forward computation is effectively improved. Adoption of a dedicated on-chip cache for multilayer neural network reverse training fully mines reusability of the input neurons and the weight data, avoids repeated reading of these data from the memory, reduces a memory access bandwidth, and solves the performance bottleneck problems brought by a memory bandwidth to the multilayer artificial neural network forward computation.

In S206, a target original image with the first resolution is acquired, and the target original image is compressed on the basis of the compression neural network model to obtain a target compressed image with the second resolution.

The target original image is an image consistent with the type of the tag information of the training image (image belonging to the same data set). If the loss function is convergent to the first threshold value or the count of training times is more than or equal to the second threshold value, training of the compression neural network is completed, the image may directly be input into the compression neural network and subjected to image compression to obtain the target compressed image, and the target compressed image may be recognized by the recognition neural network.

In one implementation, after the operation that the target original image is compressed on the basis of the compression neural network model to obtain the target compressed image with the second resolution, the method further may include that: the target compressed image is recognized on the basis of the recognition neural network model to obtain tag information of the target original image, and the tag information of the target original image is stored.

In other words, after training of the compression neural network is completed, the compressed image may be recognized on the basis of the recognition neural network model, so that artificial recognition efficiency and accuracy of the tag information are improved.

In S207, the target model is updated according to the loss function to obtain an updated model, the updated model is determined as the target model, a next training image is determined as the original image, and the S202 is performed.

According to the embodiment, the loss function is acquired through a reference tag value, which is obtained by the recognition neural network model obtained by training, and a target tag value of the original image. Training is completed if the loss function meets a preset condition or the present number of training times of the compression neural network exceeds the preset threshold value, otherwise the compression neural network is trained to repeatedly regulate its weight, in other words, an image content represented by each pixel in the same image is regulated, so as to reduce loss of the compression neural network. Image compression is performed through the compression neural network model obtained by training, so that image compression effectiveness is improved, and improvement of recognition accuracy is facilitated.

Figure 10:
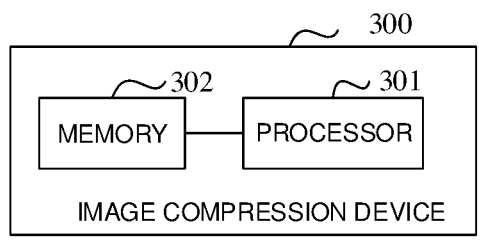
FIG. 10 is a schematic flowchart of an image compression method according to an embodiment of the application.

FIG. 10 is a schematic structure diagram of an image compression device 300 according to an embodiment of the application. As shown in FIG. 10, the image compression device 300 may include a processor 301 and a memory 302.

In the embodiment of the application, the memory 302 may be configured to store a first threshold value, a second threshold value, a present neural network model and the count of training times of a compression neural network, a compression training image set of the compression neural network, tag information of each training image in the compression training image set, a recognition neural network model, and a compression neural network model. The present neural network model of the compression neural network is determined as a target model, the compression neural network model is a corresponding target model if training of the compression neural network is completed, and the recognition neural network model is a corresponding neural network model if training of a recognition neural network is completed.

The processor 301 may be configured to acquire an original image with a first resolution, in which the original image may be any training image of the compression training image set and tag information of the original image may be determined as target tag information. The processor 301 may be configured to compress the original image on the basis of the target model to obtain a compressed image with a second resolution, in which the second resolution may be lower than the first resolution. The processor 301 may be further configured to recognize the compressed image on the basis of the recognition neural network model to obtain reference tag information. The processor 301 may be configured to acquire a loss function according to the target tag information and the reference tag information, if the loss function is convergent to the first threshold value or the count of training times is more than or equal to the second threshold value, to acquire a target original image with the first resolution, to confirm the target model to be the compression neural network model, and to compress the target original image on the basis of the compression neural network model to obtain a target compressed image with the second resolution.

In one implementation, the processor 301 is further configured to, if the loss function is not convergent to the first threshold value or the count of training times is smaller than the second threshold value, update the target model according to the loss function to obtain an updated model, to determine the updated model as the target model, to determine a next training image as the original image, and to perform the step of acquire the original image with the first resolution.

In one implementation, the processor 301 may be configured to preprocess the compressed image to obtain an image to be recognized and to recognize the image to be recognized on the basis of the recognition neural network model to obtain the reference tag information.

In one implementation, preprocessing may include size processing. The memory 302 may be further configured to store a basic image size of the recognition neural network. The processor 301 may be configured to, if an image size of the compressed image is smaller than the basic image size, fill the compressed image with pixels according to the basic image size to obtain the image to be recognized.

In one implementation, the compression training image set at least may include a recognition training image set. The processor 301 is further configured to adopt the recognition training image set to train the recognition neural network to obtain the recognition neural network model, each training image in the recognition training image set including at least tag information consistent with a type of the target tag information.

In one implementation, the processor 301 is further configured to recognize the target compressed image on the basis of the recognition neural network model to obtain tag information of a target original image.

The memory 302 may be further configured to store the tag information of the target original image.

In one implementation, the compression training image set may include multiple dimensions. The processor 301 may be configured to recognize the original image on the basis of the target model to obtain multiple pieces of image information, each dimension corresponding to a piece of image information, and may be configured to compress the original image on the basis of the target model and the multiple pieces of image information to obtain the compressed image.

It can be understood that: the compressed image of the original image is acquired on the basis of the target model, the reference tag information of the compressed image is acquired on the basis of the recognition neural network model, the loss function is acquired according to the target tag information included in the original image and the reference tag information, if the loss function is convergent to the first threshold value or the present number of training times of the compression neural network is more than or equal to the second threshold value, training of the compression neural network configured for image compression is completed, the target model is determined as the compression neural network model, and the target compressed image of the target original image may be acquired on the basis of the compression neural network model. In other words, the loss function is acquired through a reference tag value obtained by the recognition neural network model obtained by training and a target tag value of the original image, training is completed if the loss function meets a preset condition or the present number of training times of the compression neural network exceeds the preset threshold value, otherwise the compression neural network is trained to repeatedly regulate its weight, in other words, an image content represented by each pixel in the same image is regulated, so as to reduce loss of the compression neural network, improve image compression effectiveness, and further facilitate improvement of the recognition accuracy.

Figure 11:
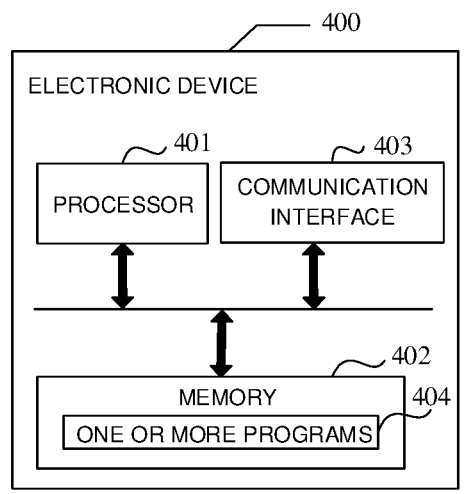
FIG. 11 is a schematic structure diagram of an electronic device according to an embodiment of the application.

An embodiment of the application, an electronic device 400 is provided. The electronic device 400 may include an image compression device 300. As shown in FIG. 11, the electronic device 400 may include a processor 401, a memory 402, a communication interface 403, and one or more programs 404. The one or more programs 404 are stored in the memory 402 and are configured to be performed by the processor 401. The programs 404 include instructions configured to perform part or all of the operations described in the abovementioned image compression method.

It is to be noted that each unit or module may be a circuit, including a digital circuit, an analogue circuit, and the like. Physical implementation of a structure of each unit or module may include, but is not limited to, a physical device, which may include, but is not limited to, a transistor, a memristor, and the like. The chip or the neural network processor may be any proper hardware processor, for example, a CPU, a GPU, an FPGA, a digital signal processor (DSP), and an ASIC. The storage unit may be any proper magnetic storage medium or magneto-optic storage medium, for example, a resistive random access memory (RRAM), a DRAM, a SRAM, an enhanced dynamic random access memory (EDRAM), a high bandwidth memory (HBM), and a hybrid memory cube (HMC), and the like.

The application may be applied to numerous universal or dedicated computer system environments or configurations, for example, a personal computer (PC), a server computer, a handheld device or a portable device, a tablet device, a multiprocessor system, a microprocessor-based system, a set-top box, a programmable consumer electronic device, a network PC, a minicomputer, a large computer, and a distributed computation environment including any abovementioned system or device.

According to an embodiment, the application provides a chip, which may include the abovementioned computation device. The chip may simultaneously perform various types of computation on a weight and an input neuron to achieve computational diversity. In addition, a dedicated on-chip cache for the multilayer artificial neural network computation algorithm is adopted, so that reusability of the input neurons and the weight data is fully mined, repeated reading of these data from the memory is avoided, a memory access bandwidth is reduced, and the problem that a memory bandwidth becomes a performance bottleneck of multilayer artificial neural network computation and a training algorithm of the multilayer artificial neural network computation is solved.

An embodiment of the application provides a chip package structure, which may include the abovementioned neural network processor.

An embodiment of the application provides a board card, which may include the abovementioned chip package structure.

An embodiment of the application provides an electronic device, which may include the abovementioned board card.

The electronic device may include, but is not limited to, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, a wearable device, a transportation means, a household electrical appliance, and a medical device.

The transportation means may include an airplane, a ship, and/or a vehicle. The household electrical appliance may include a television, an air conditioner, a microwave oven, a refrigerator, an electric rice cooker, a humidifier, a washing machine, an electric lamp, a gas cooker, and a range hood. The medical device may include a nuclear magnetic resonance spectrometer, a B-ultrasonic scanner, and/or an electrocardiograph.

Those of ordinary skill in the art may realize that the units and algorithm steps of each example described in combination with the embodiments of the application may be implemented by electronic hardware, computer software, or a combination of the two. For clearly describing exchangeability of the hardware and the software, compositions and steps of each example have been generally described in the descriptions according to functions. Whether these functions are performed in a hardware or software manner depends on specific applications and design constraints of the technical solutions. Professionals may realize the described functions for each specific application by use of different methods, but such realization shall fall within the scope of the application.

Those skilled in the art may clearly know that, for convenient and brief description, working processes of terminals and units described above may refer to the corresponding processes in the method embodiments and will not be elaborated herein.

In the embodiments provided by the application, it is to be understood that the disclosed terminals and methods may be implemented in other manners. For example, the device embodiment described above is only schematic. For example, division of the units is only logical function division and another division manner may be adopted during practical implementation. For example, multiple units or components may be combined or integrated into another system or some characteristics may be neglected or not performed. In addition, coupling, direct coupling, or communication connection between each displayed or discussed component may be indirect coupling or communication connection, implemented through some interfaces, devices, or units, and may be electrical, mechanical, or in other forms.

The units described as separate parts may or may not be physically separated. Parts displayed as units may or may not be physical units, and for example, may be located in the same place, or may also be distributed in multiple network units. Part or all of the units may be selected to achieve the purpose of the solutions of the embodiments of the application according to a practical requirement.

In addition, each functional unit in the embodiments of the application may be integrated into a processing unit, each unit may also physically exist independently, and two or more units may also be integrated into one unit. The integrated unit may be implemented in the form of hardware or a software functional unit.

If being implemented in the form of a software functional unit and sold or used as an independent product, the integrated unit may be stored in a computer-readable storage medium. Based on such an understanding, all or part of the technical solutions may be embodied in form of software product. The computer software product is stored in a storage medium, including a plurality of instructions configured to enable a computer device (which may be a PC, a server, a network device, or the like) to perform all or part of the operations of the method in each embodiment of the application. The storage medium may include various media capable of storing program codes such as a U disk, a mobile hard disk, a read-only memory (ROM), a random access memory (RAM), a magnetic disk, or an optical disk.

It is to be noted that implementation modes which are not shown or described in the drawings or the body of the specification are all in forms known to those of ordinary skill in the art and are not described in detail. In addition, the definitions about each component and method are not limited to each specific structure, shape, or manner mentioned in the embodiments, to which those of ordinary skill in the art may make simple modifications or replacements.

The purposes, technical solutions, and beneficial effects of the application are further described above with the specific embodiments in detail. It is to be understood that the above is only the specific embodiment of the application and not intended to limit the application. Any modifications, equivalent replacements, improvements, and the like made within the spirit and principle of the application shall fall within the scope of protection of the application.

What is claimed:

1. An image compression method, comprising:
acquiring an original image with a first resolution,
wherein the original image is an image included in a compression training image set of a compression neural network, and
wherein a tag information of the original image is determined as a target tag information;
compressing the original image based on a target model to obtain a compressed image with a second resolution, wherein the second resolution is lower than the first resolution, and
wherein the target model is a present neural network model of the compression neural network;
recognizing the compressed image based on a recognition neural network model to obtain reference tag information,
wherein the recognition neural network model is a corresponding neural network model if training of a recognition neural network is completed;
acquiring a loss function according to the target tag information and the reference tag information;
if the loss function is convergent to a first threshold value or if a present number of training times of the compression neural network is more than or equal to a second threshold value, acquiring a target original image with the first resolution;
determining the target model as a corresponding compression neural network model if training of the compression neural network is completed; and
compressing the target original image based on the compression neural network model to obtain a target compressed image with the second resolution.

2. The image compression method of claim 1, further comprising:
if the loss function is not convergent to the first threshold value or if the present number of training times of the compression neural network is less than the second threshold value,
updating the target model according to the loss function to obtain an updated model,
determining the updated model as the target model,
determining a next training image as a next original image, and
acquiring the next original image with the first resolution.

3. The image compression method of claim 1, wherein recognizing the compressed image based on the recognition neural network model to obtain the reference tag information includes:
preprocessing the compressed image to obtain an image to be recognized; and
recognizing the image to be recognized based on the recognition neural network model to obtain the reference tag information.

4. The image compression method of claim 3, wherein preprocessing includes size processing, and preprocessing the compressed image to obtain the image to be recognized includes:
if an image size of the compressed image is smaller than a basic image size of the recognition neural network, filling the compressed image with pixels according to the basic image size to obtain the image to be recognized.

5. The image compression method of claim 1, wherein the compression training image set includes at least a recognition training image set, and the method further includes:
adopting the recognition training image set to train the recognition neural network to obtain the recognition neural network model, wherein each training image in the recognition training image set includes at least tag information identical to a type of the target tag information.

6. The image compression method of claim 1, wherein after compressing the target original image based on the compression neural network model to obtain the target compressed image with the second resolution, the method further includes:
recognizing the target compressed image based on the recognition neural network model to obtain tag information of the target original image, and storing the tag information of the target original image.

7. The image compression method of claim 1, wherein the compression training image set includes multiple dimensions, and compressing the original image based on the target model to obtain the compressed image with the second resolution includes:
  recognizing the original image based on the target model to obtain multiple pieces of image information, wherein each dimension corresponds to a piece of the image information; and
  compressing the original image based on the target model and the multiple pieces of image information to obtain the compressed image.

8. An image compression device, comprising
  a memory configured to store a first threshold value, a second threshold value, a present neural network model and training times of a compression neural network, a compression training image set of the compression neural network, a tag information of each training image in the compression training image set, a recognition neural network model, and a compression neural network model,
    wherein the present neural network model of the compression neural network is determined as a target model,
    wherein the compression neural network model is a corresponding target model if training of the compression neural network is completed, and
    wherein the recognition neural network model is a corresponding neural network model if training of a recognition neural network is completed; and
  a processor configured to:
    acquire an original image with a first resolution, wherein the original image is any training image in the compression training image set and a tag information of the original image is determined as target tag information,
    compress the original image based on the target model to obtain a compressed image with a second resolution, wherein the second resolution is lower than the first resolution,
    recognize the compressed image based on the recognition neural network model to obtain reference tag information, and
    acquire a loss function according to the target tag information and the reference tag information,
    wherein if the loss function is convergent to the first threshold value or the count of training times is more than or equal to the second threshold value, the processor is further configured to:
      acquire a target original image with the first resolution, to determine the target model as the compression neural network model, and
      compress the target original image based on the compression neural network model to obtain a target compressed image with the second resolution.

9. The image compression device of claim 8, wherein if the loss function is not convergent to the first threshold value or the count of training times is smaller than the second threshold value the processor is further configured to:
  update the target model according to the loss function to obtain an updated model,
  determine the updated model as the target model,
  determine a next training image as a next original image, and
  perform the operation of acquiring the next original image with the first resolution.

10. The image compression device of claim 8, wherein the processor is configured to:
  preprocess the compressed image to obtain an image to be recognized, and
  recognize the image to be recognized based on the recognition neural network model to obtain the reference tag information.

11. The image compression device of claim 10, wherein the memory is further configured to:
  store a basic image size of the recognition neural network, and
  if an image size of the compressed image is smaller than the basic image size, fill the compressed image with pixels according to the basic image size to obtain the image to be recognized.

12. The image compression device of claim 8,
  wherein the compression training image set includes at least a recognition training image set, and
  wherein the processor is further configured to adopt the recognition training image set to train the recognition neural network to obtain the recognition neural network model, and
  wherein each training image in the recognition training image set includes at least a tag information identical to a type of the target tag information.

13. The image compression device of claim 8,
  wherein the processor is further configured to recognize the target compressed image based on the recognition neural network model to obtain tag information of the target original image; and
  wherein the memory is further configured to store the tag information of the target original image.

14. The image compression device of claim 8,
  wherein the compression training image set includes multiple dimensions, and
  wherein the processor is further configured to recognize the original image based on the target model to obtain multiple pieces of image information,
  wherein each dimension corresponds to a piece of the image information and compress the original image based on the target model and the multiple pieces of image information to obtain the compressed image.

* * * * *